US012776732B2

(12) United States Patent
Libbos et al.

(10) Patent No.: US 12,776,732 B2
(45) Date of Patent: Oct. 27, 2026

(54) ELECTRONIC POLE-CHANGING FOR INDUCTION MOTORS

(71) Applicant: THE BOARD OF TRUSTEES OF THE UNIVERSITY OF ILLINOIS, Urbana, IL (US)

(72) Inventors: Elie Libbos, Champaign, IL (US); Arijit Banerjee, Urbana, IL (US); Debranjan Mukherjee, Urbana, IL (US); Soumil Chaubal, Urbana, IL (US); Anuj Maheshwari, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 243 days.

(21) Appl. No.: 18/778,495

(22) Filed: Jul. 19, 2024

(65) Prior Publication Data

US 2025/0047226 A1 Feb. 6, 2025

Related U.S. Application Data

(60) Provisional application No. 63/517,679, filed on Aug. 4, 2023.

(51) Int. Cl.
*H02K 21/14* (2006.01)
*H02P 21/00* (2016.01)
(Continued)

(52) U.S. Cl.
CPC .......... *H02P 21/30* (2016.02); *H02P 21/0021* (2013.01); *H02P 21/22* (2016.02)

(58) Field of Classification Search
CPC ......... H02P 21/30; H02P 21/22; H02K 21/14; H02K 1/146
See application file for complete search history.

(56) References Cited

U.S. PATENT DOCUMENTS 8,179,068 B2 5/2012 Yuuki et al.
8,436,569 B2 5/2013 Fuchs
(Continued)

OTHER PUBLICATIONS

Libbos et al., "Loss Minimization and Maximum Torque-Per-Ampere Operation for Variable-Pole Induction Machines," IEEE Transactions on Transportation Electrification, 2020, pp. 1051-1064, vol. 6. No. 3, IEEE.
(Continued)

*Primary Examiner* — Cortez M Cook
(74) *Attorney, Agent, or Firm* — Greer, Burns & Crain, Ltd.; Steven P. Fallon

(57) ABSTRACT

An induction motor includes a plurality of flux linkage configurations that control current to drive relative movement between a rotor and a stator. Each flux configuration powers a different number of poles. A controller is configured to droop switch flux linkage configurations by ramping up torque in a new configuration $h_1$ at the same rate as torque decay by decaying flux from a previous configuration $h_2$. Multiple flux configurations can also be powered during steady state. A method for smoothing torque transitions receives a command to change from one of a plurality of flux configurations to another of the plurality of the flux configurations. Torque is ramped up in the another flux configuration at the same rate as decaying torque in the one of the plurality of flux configurations.

17 Claims, 13 Drawing Sheets

(51) Int. Cl.
*H02P 21/22* (2016.01)
*H02P 21/30* (2016.01)

(56) References Cited

U.S. PATENT DOCUMENTS

| | | | | |
|---|---|---|---|---|
| 9,748,886 | B1 | 8/2017 | McDonald et al. | |
| 10,855,218 | B2 | 12/2020 | Zhang | |
| 2010/0123426 | A1* | 5/2010 | Nashiki .................. | H02K 1/146 310/46 |
| 2025/0211148 | A1* | 6/2025 | Mao ........................ | H02K 21/14 |

OTHER PUBLICATIONS

Libbos et al., "Winding Layout Considerations for Variable-Pole Induction Motors in Electric Vehicles," IEEE Transactions on Transportation Electrification, 2023, pp. 5214-5225, vol. 9, No. 4, IEEE.

Osama et al., "Modeling and Analysis of a Wide-Speed-Range Induction Motor Drive Based on Electronic Pole Changing," IEEE Transactions on Industry Applications, 1997, pp. 1177-1184, vol. 33, No. 5, IEEE.

Magill, "An Investigation of Electronic Pole Changing in High Inverter Count Induction Machines," Ph.D. Dissertation, 2015, University of Illinois at Urbana-Champaign.

Magill et al., "A Dynamic Pole-Phase Modulation Induction Machine Model," 2015 IEEE International Electric Machines & Drives Conference (IEMDC), 2015, pp. 13-19, IEEE.

Wu et al., "Pole-Transition Control of Variable-Pole Machines Using Harmonic-Plane Decomposition," IEEE Transactions on Industrial Electronics, 2023, pp. 7753-7760, vol. 70, No. 8, IEEE.

Ch et al., "Gradual Electronic Pole Changing Technique to Minimize the Circulating Currents During Pole/Mode Transition in Induction Motor Drive," IEEE Transactions on Industry Applications, 2023, pp. 959-969, vol. 59, No. 1, IEEE.

Olson et al., "Parameter Estimation of Multiphase Machines Applicable to Variable Phase-Pole Machines," IEEE Transactions on Energy Conversion, 2023, pp. 2822-2831, vol. 38, No. 4, IEEE.

Raj et al., "Design of a Variable Phase-Pole Induction Machine for Electric Vehicle Applications," 2022 International Conference on Electrical Machines (ICEM), 2022, pp. 976-982, IEEE.

Libbos et al., "Variable-Pole Induction Machine Drive for Electric Vehicles," 2019 IEEE International Electric Machines & Drives Conference (IEMDC), 2019, pp. 515-522, IEEE.

Libbos et al., "Modular Multiphase Drives for Variable-Pole Induction Machines in Electric Vehicles," 2020 IEEE Applied Power Electronics Conference and Exposition (APEC), 2019, pp. 696-703, IEEE.

Haq et al., "Generalized Harmonic Injection Strategy for Multiphase Induction Machine Control," IEEE Transactions on Energy Conversion, 2024, pp. 1245-1254, vol. 39, No. 2, IEEE.

* cited by examiner

ELECTRONIC POLE-CHANGING FOR INDUCTION MOTORS

PRIORITY CLAIM AND REFERENCE TO RELATED APPLICATION

The application claims priority under 35 U.S.C. § 119 and all applicable statutes and treaties from prior U.S. provisional application Ser. No. 63/517,679, which was filed Aug. 4, 2023.

STATEMENT OF GOVERNMENT INTEREST

This invention was made with government support under grant number 1449548 awarded by the National Science Foundation. The government has certain rights in the invention.

TECHNICAL FIELD

A field of the invention is induction machines, including variable-pole induction machines (VPIMs). An example application of the invention is to a VPIM in an electric vehicle (EV). Embodiments of the invention also provide a continuous variable-pole induction machine (CVP).

BACKGROUND

Hybrid and plug-in electric vehicles use rare earth permanent magnets in their drive motors. Magnets are heavy, expensive and utilize scarce resources. Magnets require rare earths, which are scarce and expensive. The acquisition of rare earths for use in magnets, such as magnets in EV motors, reduce the net environmental benefit of EVs and also increase the cost of EVs. Because of the high costs of magnets and rotor fabrication, these motors are relatively expensive There is therefore interest in adapting induction motors to EV usage. VPIMs as induction machines have an ability to maintain constant power over a wide speed range, provide higher power density than standard induction machines, and possess and system-level efficiency and thermal management advantages. Current VPIMs lack an ability to vary the pole count smoothly and quickly enough during operation and are therefore presently unsuitable for use in EVs. A smooth transition minimizes torque bumps and prevents a driver from feeling jerkiness during acceleration of the vehicle. Existing techniques for VPIMs, such as ramp and step commands, are unable to achieve smoothness with sufficient speed of transition.

References [1]-[3] have shown that an 18-leg converter combined with toroidal winding can reconfigure a VPIM to six-,four- and two-pole operation. Six-pole is used to deliver peak torque because it enables minimizing yoke thickness which reduces core volume and toroidal winding end-length which reduces copper losses. Switching to two-pole minimizes ac losses and increases torque capability at high speeds. The four-pole configuration maximizes torque capability in the intermediate torque range and minimizes losses in the intermediate torque-speed regime. However, introducing four-pole configurations comes with three major challenges: 1) requiring double the number of inverter legs [5] 2) Pole transitions from consecutive poles p and p+2 such as four- and two- and two- and six-introduces radial forces which are significant and can affect bearing life [4] 3) reconfiguring pole in operation is a challenge for VPIMs because it can lead to tradeoffs between duration of transition, current amplitude, torque bump and radial forces.

REFERENCES

[1] E. Libbos, B. Ku, S. Agrawal, S. Tungare, A. Banerjee and P. T. Krein, "Loss Minimization and Maximum Torque-Per-Ampere Operation for Variable-Pole Induction Machines," in IEEE Transactions on Transportation Electrification, vol. 6, no. 3, pp. 1051-164-9-2020, doi: 10.1109/TTE.2020.2997692.

[2] E. Libbos, E. Krause, A. Banerjee and P. T. Krein, "Inverter Design Considerations for Variable-Pole Induction Machines in Electric Vehicles," in IEEE Transactions on Power Electronics, vol. 37, no. 11, pp. 1355413565, November 2022, doi: 10.1109/TPEL.2022.3177082.

[3] E. Libbos, E. Krause, A. Banerjee and P. T. Krein, "Winding Layout Considerations for Variable-Pole Induction Motors in Electric Vehicles," in IEEE Transactions on Transportation Electrification, doi: 10.1109/TTE.2023.3248444.

[4] M. Osama and T. A. Lipo, "Modeling and analysis of a wide-speed-range induction motor drive based on electronic pole changing," in IEEE Transactions on Industry Applications, vol. 33, no. 5, pp. 1177-1184, September October 1997, doi: 10.1109/28.633794.

[5] M. Magill, "An investigation of electronic pole changing in high inverter count induction machines," Univ. Illinois at Urbana-Champaign, Champaign, IL, USA, Tech. Rep. UILU-ENG2015-2505, CEME-TR-2015-01, April 2015.

SUMMARY OF THE INVENTION

A preferred embodiment provides induction motor that includes a plurality of flux linkage configurations that control current to drive relative movement between a rotor and a stator. Each flux configuration powers a different number of poles. A controller is configured to droop switch flux linkage configurations by ramping up torque in a new configuration $h_1$ at the same rate as torque decay by decaying flux from a previous configuration $h_2$. Multiple flux configurations can also be powered during steady state.

A preferred method for smoothing torque transitions of an induction motor that has a plurality of flux linkage configurations includes receiving a command to change from one of the plurality of flux configurations to another of the plurality of the flux configurations. Torque is ramped up in the another flux configuration at the same rate as decaying torque in the one of the plurality of flux configurations.

DETAILED DESCRIPTION OF THE PREFERRED EMBODIMENTS

Preferred embodiments provide a controller for VPIMs that can be referred to as a droop controller, the operation of which provides a near bumpless and fast transition. A preferred control technique achieves a near bumpless transition by ramping up torque in the new configuration $h_1$ at the same rate as torque decay due to deflux of a previous configuration $h_2$. This is achieved in implementation by dividing the torque command among the two configurations by drooping it proportionally to torque command.

In preferred variations, more than one configuration is kept active during continuous operation of the VPIM to create a continuous variable pole (CVP) machine. There is a continuous reconfiguration of virtual, superimposed states. For example, both configuration $h_1$ and configuration $h_2$ are kept active in steady-state. During a torque-speed operation change, the flux linkage of the configurations changes continuously and the torque produced by each change, while completely eliminating pole-changing transient.

A preferred continuous variable-pole (CVP) induction machine changes the model from conventional VPIMs, in which the pole is either configured to two- or six-pole but not both. In a present CVP machine, the machine is configured as a combination of several pole configurations in non-acceleration to steady-state. In an intermediate speed range, the IM steady-state flux linkage is a mix of six- and two-pole which improves torque capability. A hybrid six-/two-pole CVP operation improves torque in the intermediate speed range similar to a four-pole configuration, without requiring the extra inverter legs to reverse current and the radial forces associated during pole dynamics. Transitions are completely eliminated in the CVP machine. The flux linkage is continuously adjusted in each configuration without the need to switch from one to another. Pole transitions are completely eliminated in the preferred CVP machine.

Preferred embodiments of the invention will now be discussed with respect to experiments and drawings. Broader aspects of the invention will be understood by artisans in view of the general knowledge in the art and the description of the experiments that follows.

Figure 1A:
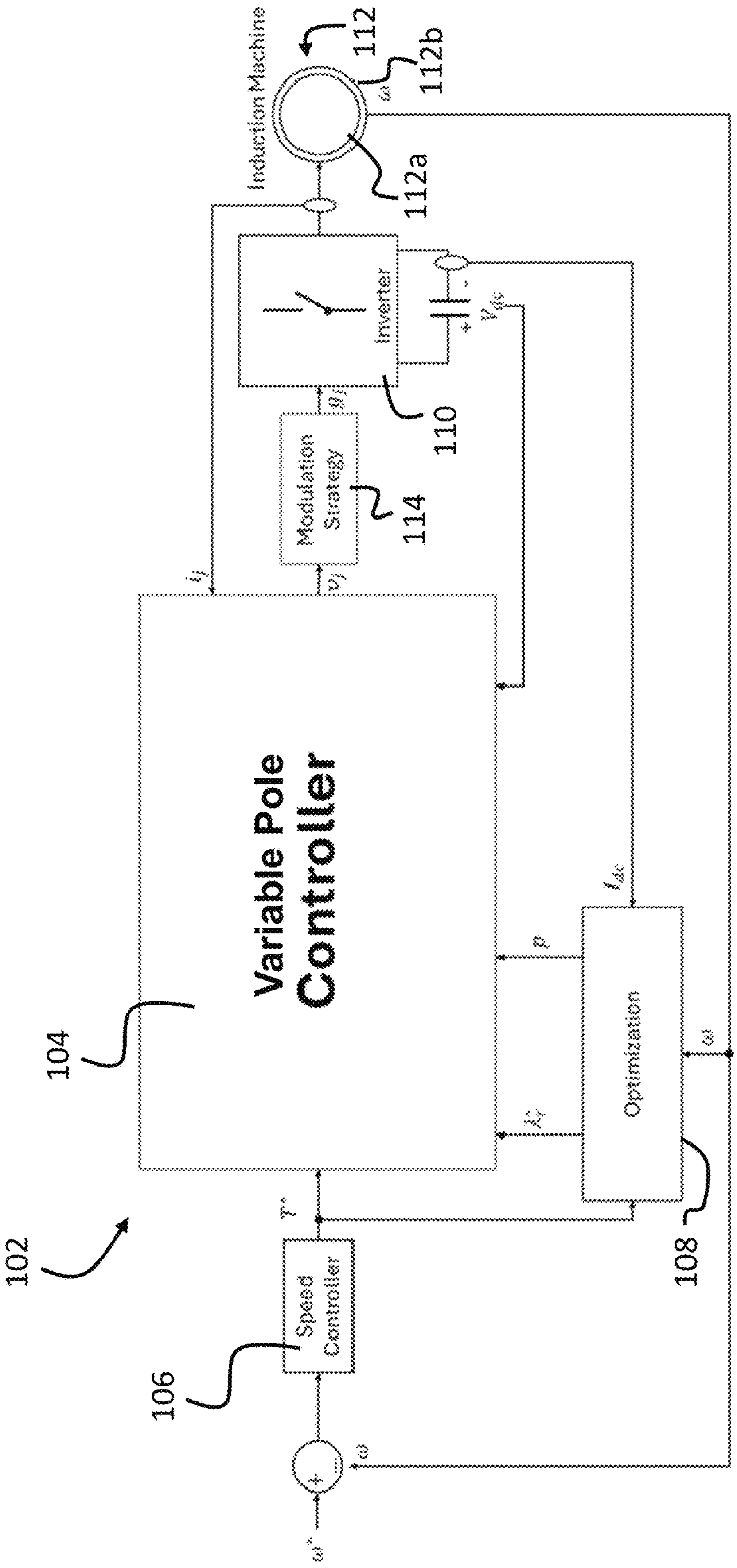
FIG. 1A is a block diagram of a preferred induction motor with a variable pole controller.

FIG. 1A is a block diagram of a preferred induction motor 102 with a variable pole controller 104. An optional speed measurement and controller 106 can implement an automated input of torque, such as from a cruise control system in an automobile. The variable pole controller 104 takes torque as an input and hence, speed measurement and controller 106 is unnecessary for a manually controlled motor, such as a driven car when the user provides the torque input. Optimization software 108 runs in real time to minimize losses. Input power across an inverter 110 can be measured by measuring dc-link voltage and dc-link current or it can be estimated using measured line currents and applied voltage. The estimation-based method does not need an additional current sensor, however it can't take into account the losses in the inverter 110. The inverter provides power to an induction machine 112 having a rotor and stator. A modulation strategy module 114 responds to the variable pole controller 104 to achieve bumpless control of the induction machine 112 through the inverter 110. The modulation strategy module 114 can use a conventional modulation scheme such as sine triangle and space vector modulation. The variable-pole controller 104 only needs to know the achievable voltage limits of the modulation strategy to set the achievable limits.

A modified modulation strategy can also be used for the modulation strategy module 114. A modified modulation strategy can be implemented by adding/subtracting a common mode component separately to the odd and even phases. The common mode component is calculated by adding the maximum and minimum values of all the odd or even phases. This addition of common mode component and combination of multiple pole excitation provides the maximum dc bus utilization under all operating conditions. This non-zero common mode modulation strategy and its impact on allowable voltage magnitude injection is discussed with respect to FIGS. 1B-1I.

Figure 1B:
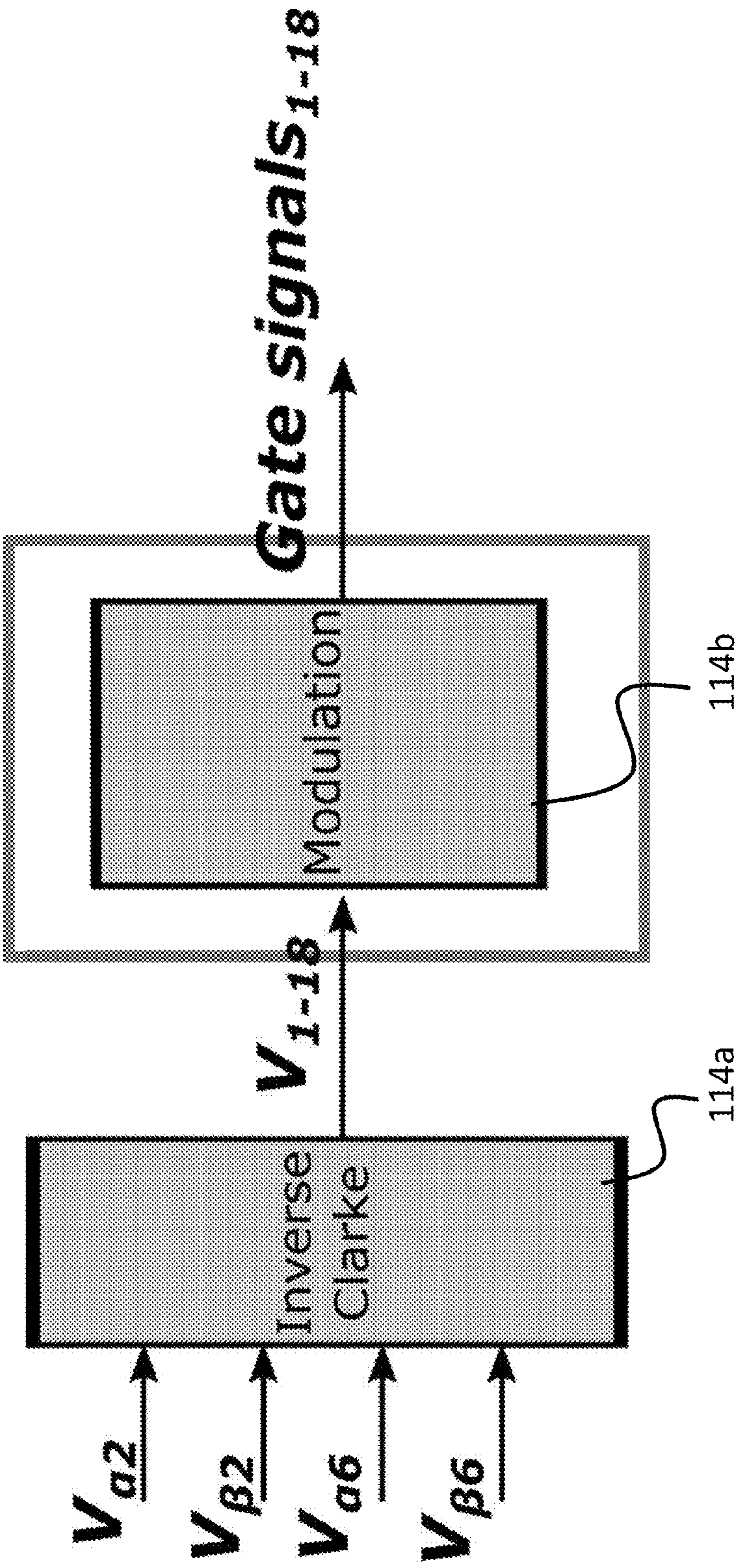
FIGS. 1B-1I show a preferred non-zero common mode modulation strategy and its impact on allowable voltage magnitude injection that can be used as the modulator module in FIG. 1A.

In FIG. 1B an inverse Clarke transform **114*a* receives the variable pole controller 104 voltage outputs and a modulation module 114*b*** adds a common mode signal for better DC bus utilization. The two common mode signals are calculated as the negative of the average of the maximum and minimum phase voltage signal. The resultant modulation limits of this modulation can be visualized by plotting the values of the allowed 6 pole voltages with respect to the allowed 2 pole voltages.

Figure 1C:
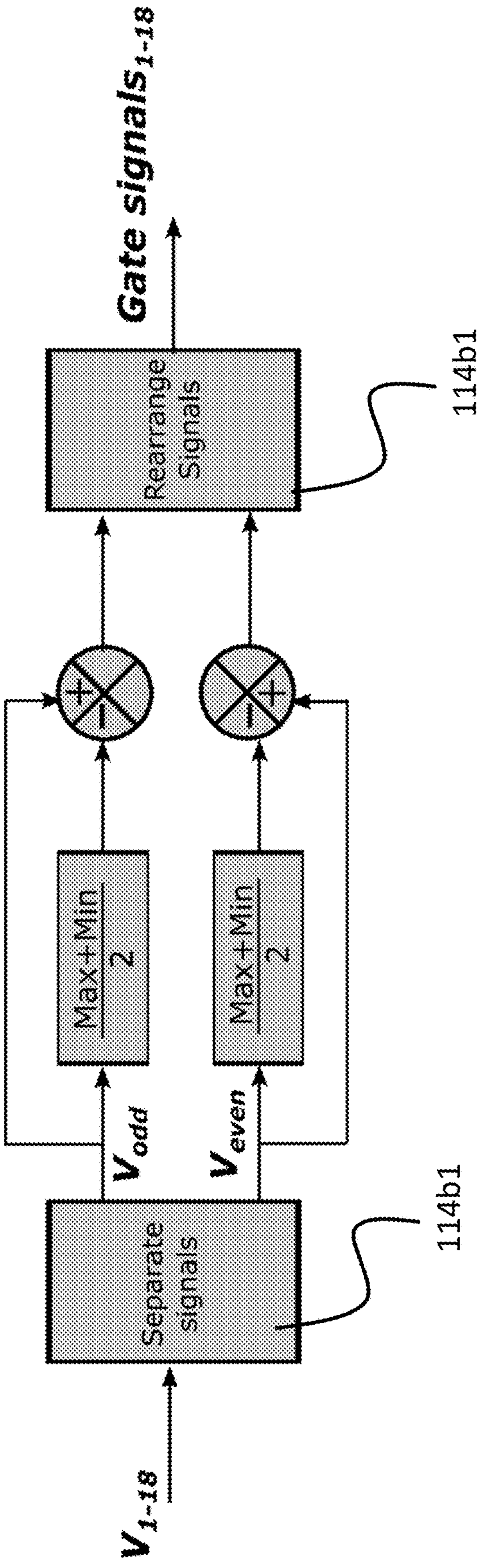

FIG. 1C shows a preferred architecture of the modulation module **114*b* of FIG. 1B. A two neutral connection with odd phases and even phases separated out to ensure a non-zero common mode component is implemented by the architecture of FIG. 1C. A module 114*b*1 separates the voltage signals into even and odd signals. The average of the minimum and maximum is subtracted from each of the even and odd signals, which are then rearranged together in the module 114*b*1**.

Figure 1D:
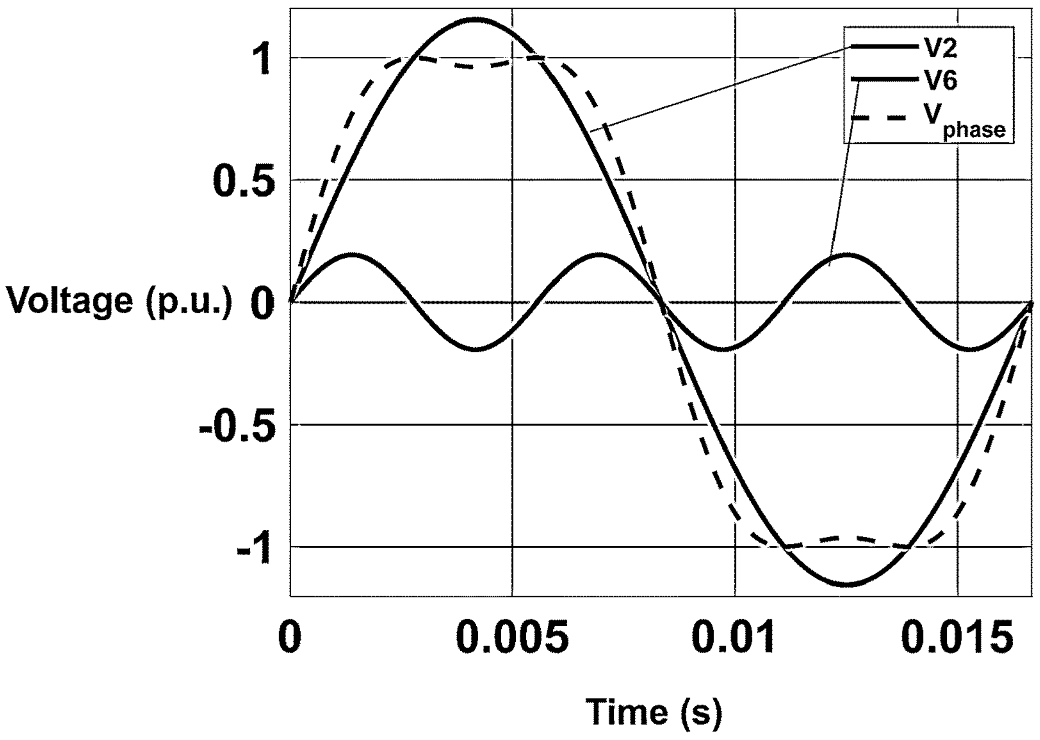
Figure 1E:
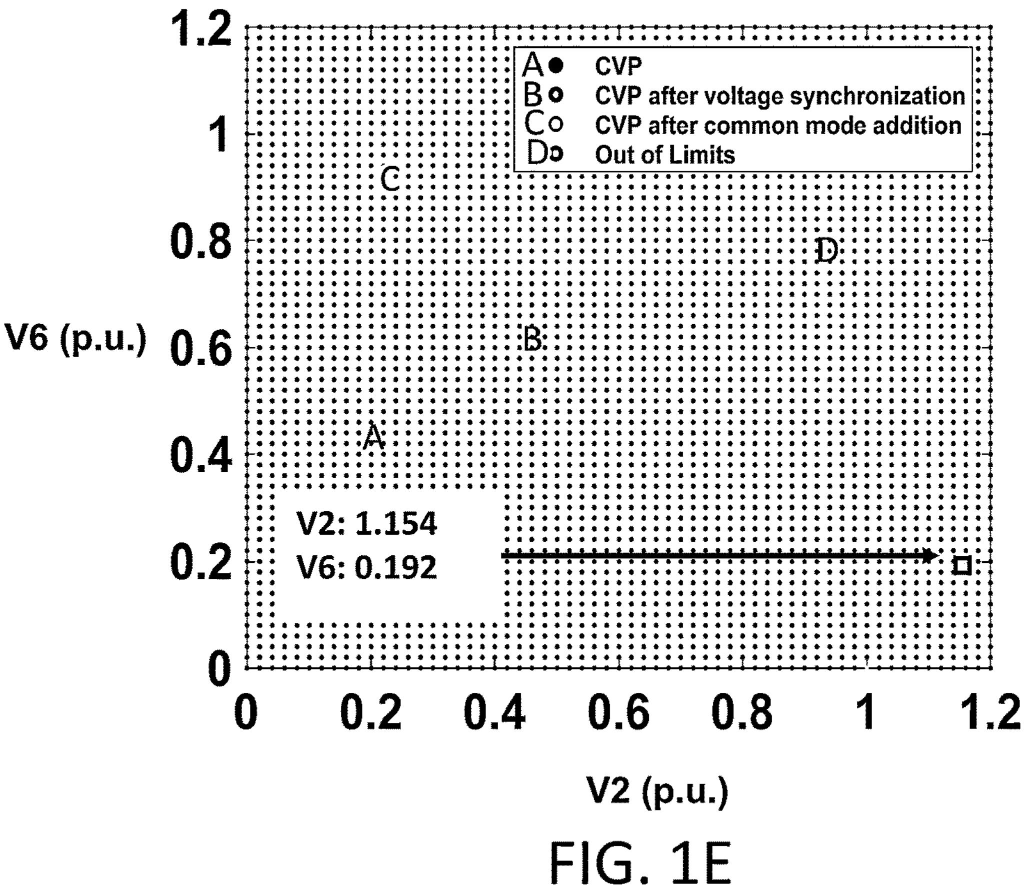
Figure 1F:
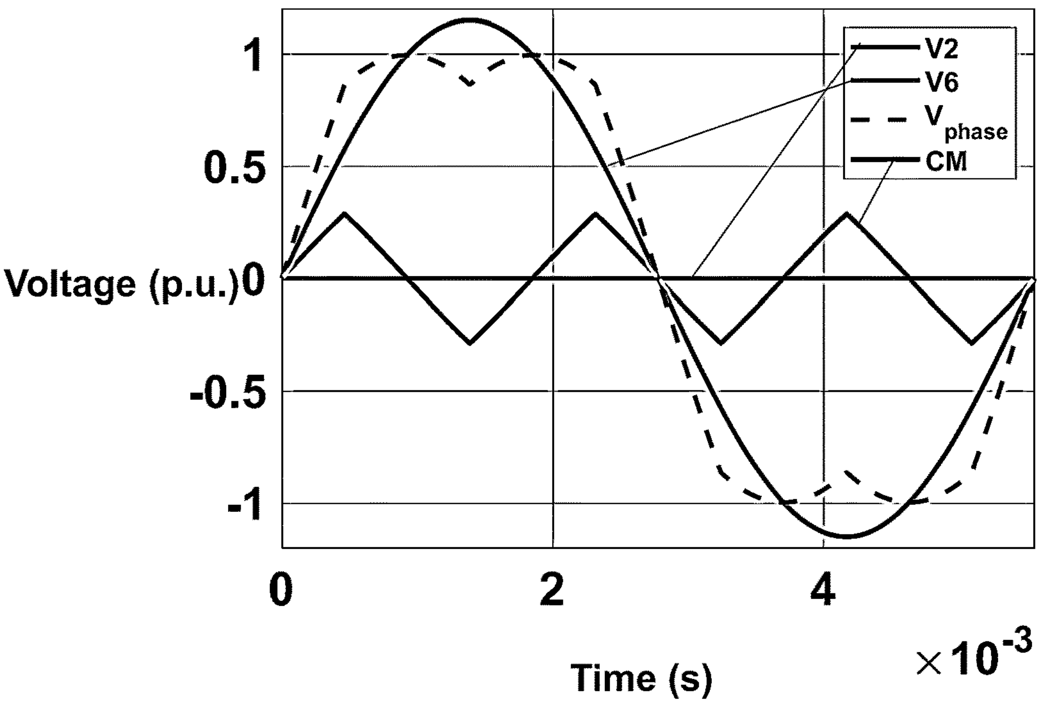
Figure 1G:
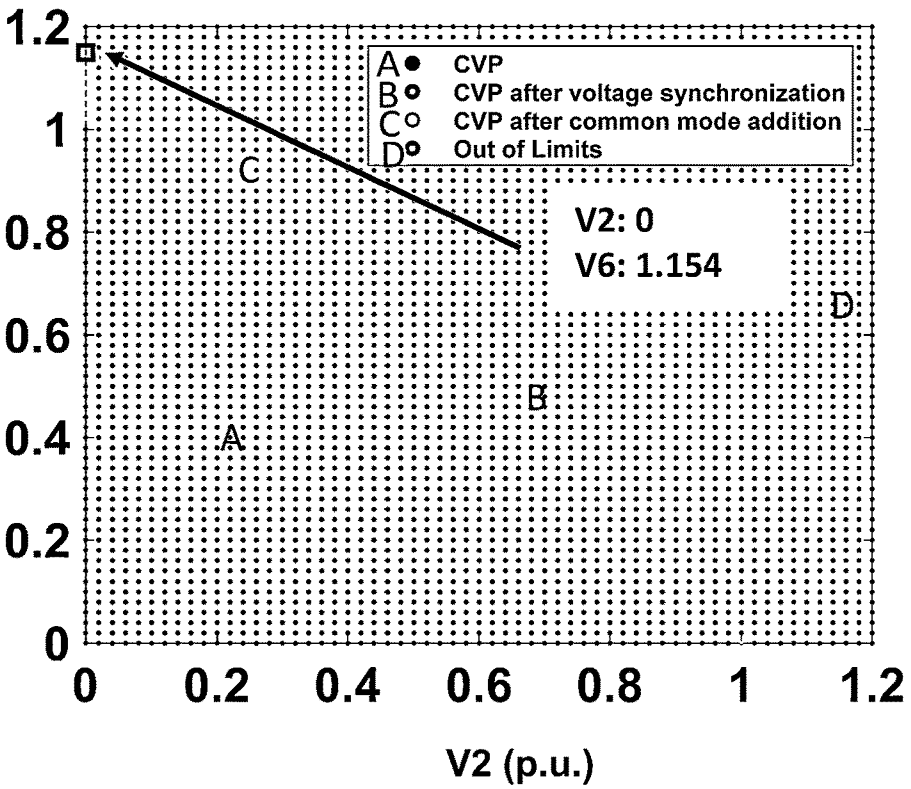
Figure 1H:
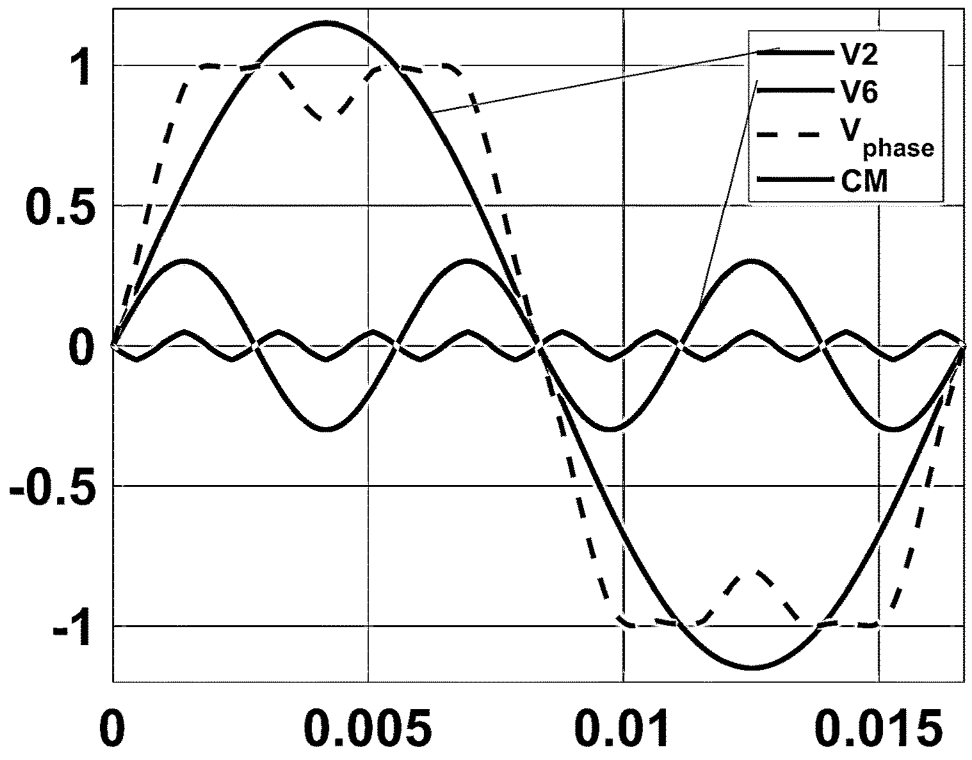
Figure 1I:
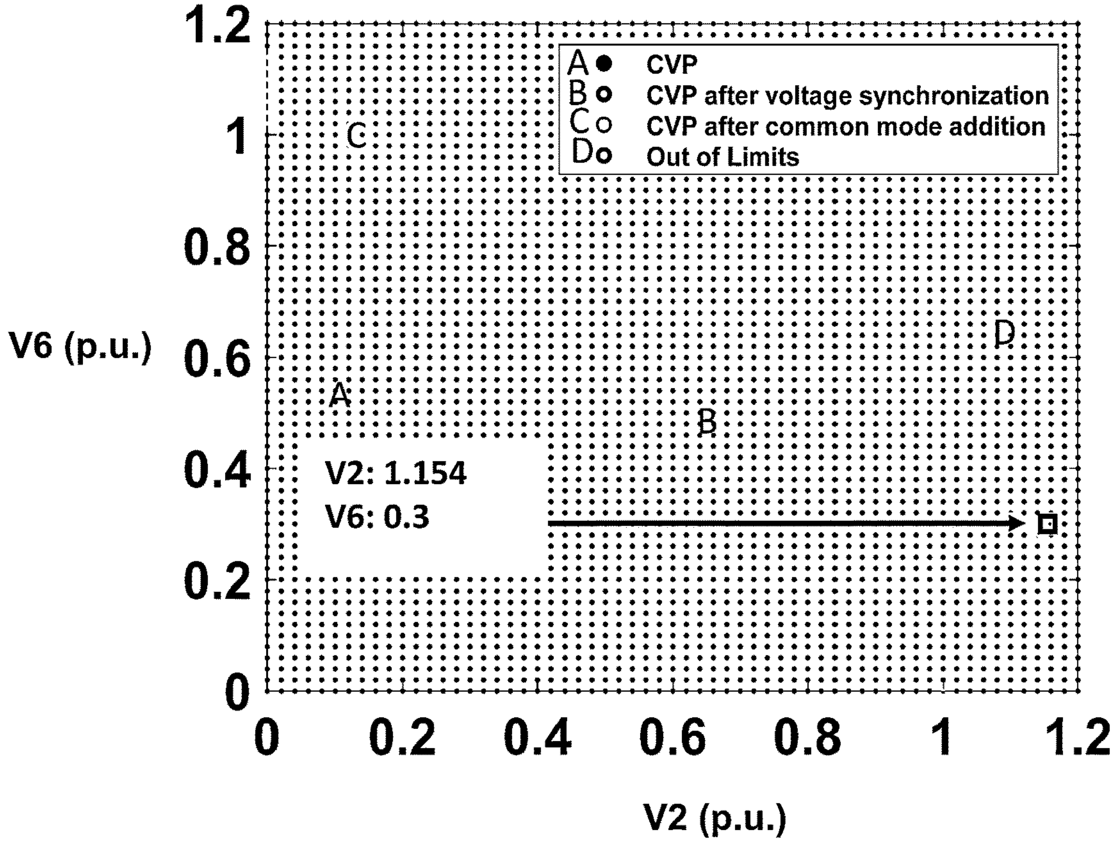

FIGS. 1D and 1E respectively show the modulation curves and plot of shows the voltage values of 6 and 2 pole such that the total phase voltage is below 1 pu for three cases. The A region represents the voltage limits if no synchronization was done. The B region represents the voltage limits with synchronization conducted. The C region represents the voltage limits if synchronization was conducted and the common mode strategy of FIGS. 1B and 1C is applied. The D region is out of limits. The marked point shows the boundary of the blue and green region where it can be observed that a 15% increase in the 2 pole component is possible due to addition of 6 pole in a synchronized way, similar to third harmonic injection. FIGS. 1F and 1G show the case where 6 pole dominant injecting common mode leads to a Spacevector modulation type modulation scheme. FIGS. 1H and 1I show the case of injecting common mode when both 2 pole and 6 pole components are at present, which allows 0.3 p.u of 6 pole component being injected instead of the previous 0.192 p.u. As seen in these figures, the Modulation module **114*b*** seamlessly boosts dc bus utilization capability irrespective of the pole configuration. The upper boundary of the C region thus provides limits on the 2 and 6 pole voltages. Interestingly, the limits are interdependent, i.e., the amount of 6 pole injected would determine the limits for the two pole voltages.

Returning to FIG. 1A, the variable pole controller 104 receives an $i_j$ per-phase current measurement from the induction machine 112 and a $V_{dc}$ dc link inverter voltage from the inverter 110. The induction machine 112 has a plurality of electronically controllable flux linkage configurations that control current to drive relative movement between a rotor 112*a* and a stator 112*b*, wherein each flux configuration powers a different number of poles. The variable pole controller 104 is configured to droop switch flux linkage configurations by ramping up torque in a new configuration $h_1$ at the same rate as torque decay by decaying flux from a previous configuration $h_2$.

The variable controller 104 receives p optimal pole count selected in discrete control and an $$\lambda_r^*$$

optimal flux command for optimal pole in discrete pole control from the optimization software 108. An input torque control signal T* is provided from the speed controller 106 or derived from a manual user input of speed. An input speed command is ω* is compared to a ω measured speed to generate the torque control signal T*. The optimization software also receives the ω measured speed. The variable pole controller 104 issues a $v_j$ per-phase voltage command to the modulation strategy module 114, which converts those commands to $g_j$ per-phase gate driver signals. During transitions variable pole controller 104 commands a a continuous reconfiguration of superimposed flux states. The controller 104 can also maintain linkage to two of the plurality of flux linkage configurations during steady state motor operation.

Figure 1J:
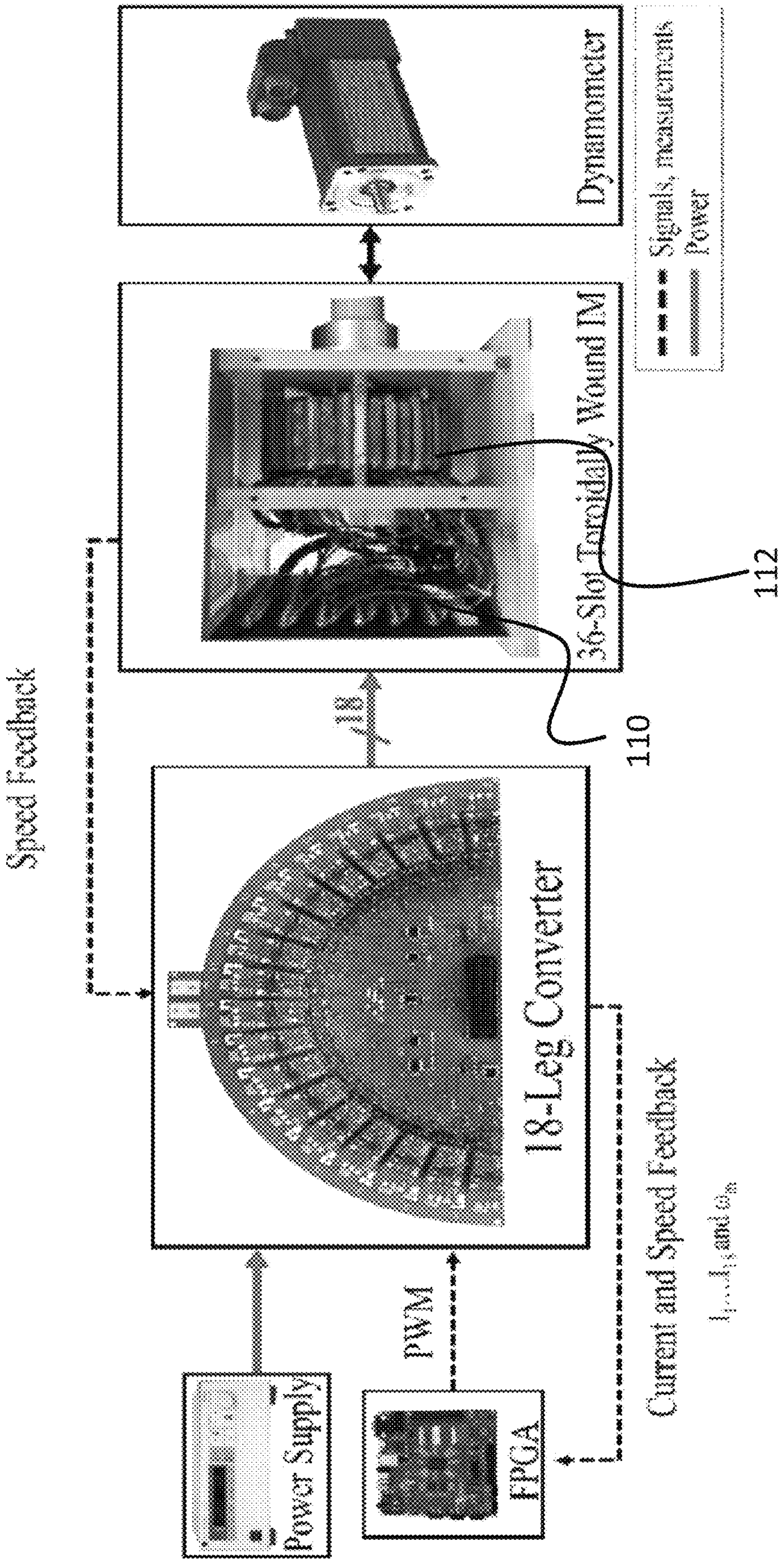
FIG. 1J is shows an experimental set up consistent with FIG. 1A.

FIG. 1J shows an experimental set up consistent with FIG. 1A. The induction machine 112 was 36-slot toroidally wound induction machine with the inverter 110 being in a separate frame, in the form of multiple modular inverters driving windings of the induction machine. An 18-leg converter and a FPGA (Field Programmable Gate Array) served as the controller 104 and optimization software 108. In place of the FPGA other signal processing units such as digital signal processing or microcontrollers can be used, as will be appreciated by artisans.

Figure 2A:
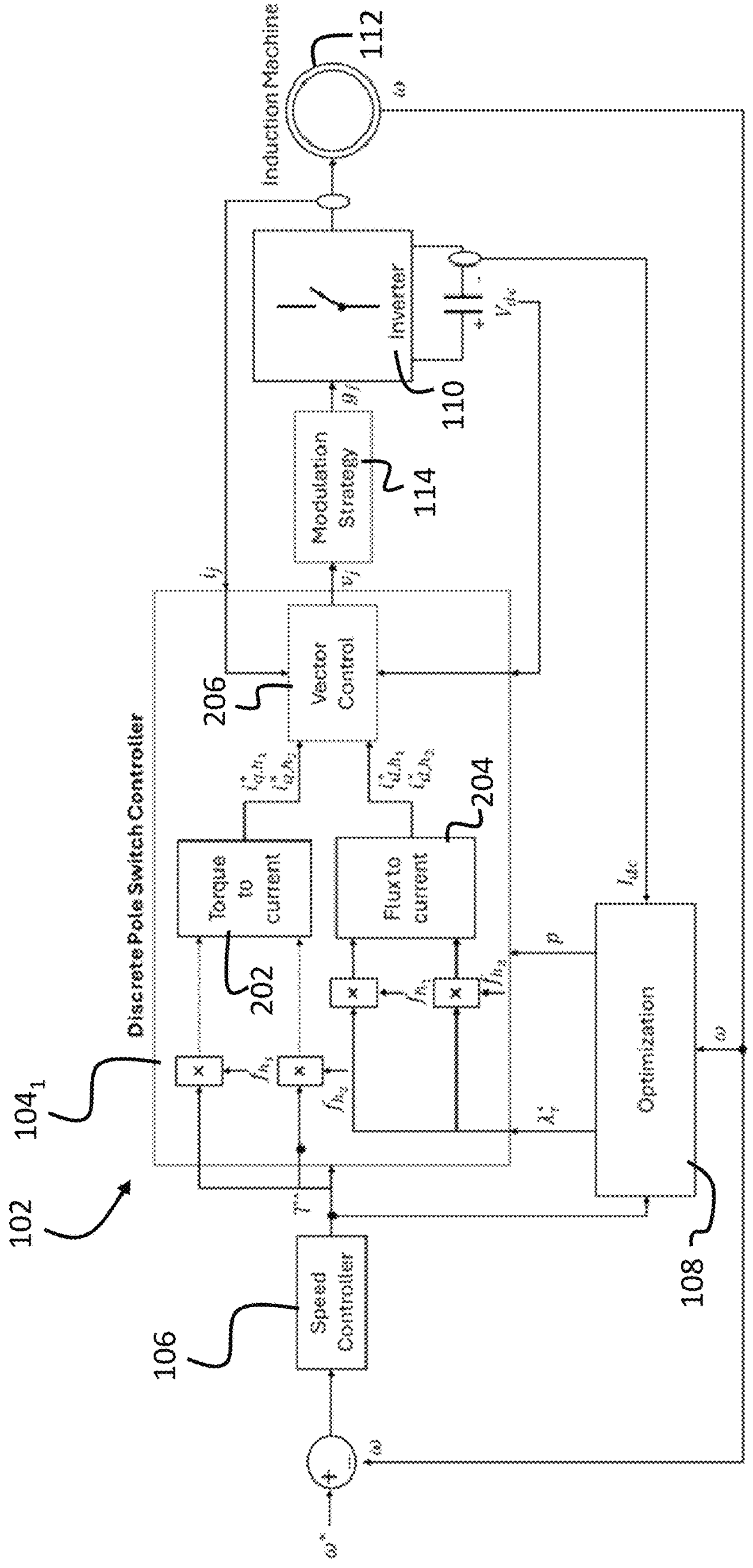
FIG. 2A is a block diagram of a preferred induction motor consistent with FIG. 1 and having a discrete variable pole controller.

FIG. 2A shows details of a discrete variable pole controller 104$_1$. The discrete variable pole controller 104$_1$ is only activated when switching from one discrete pole configuration to another. The optimization software 108 in this case selects an optimal discrete pole configuration and if it is different from the previous one, the discrete variable pole controller 104$_1$ is activated. A torque to current module 202 receives torque command and outputs q-axis current for all pole configurations. A flux to current module 204 receives a rotor flux linkage command and outputs d-axis current command for all pole configurations. A vector control module 206 switches pole configurations. When more than one pole configuration is present in discrete during a switch from one configuration to another, both pole configurations use vector control and have associated subscripts $h_1$ (new pole configuration) and $h_2$ (previous pole configuration). In steady state, the currents of only $h_1$ are non-zero while $h_2$ are zero. The torque sharing and flux linear ramp multipliers for configurations $h_1$ and $h_2$ are respectively, $$f_{h_1} = \frac{t}{\Delta t},\ f_{h_2} = 1 - \frac{t}{\Delta t}$$

when pole switching in discrete control. In steady-state, $f_{h_1}=1$, $f_{h_2}=0$ as only $h_1$ configuration is present. Δt is the pole transition duration in discrete control where both pole configurations are present.

Figure 2B:
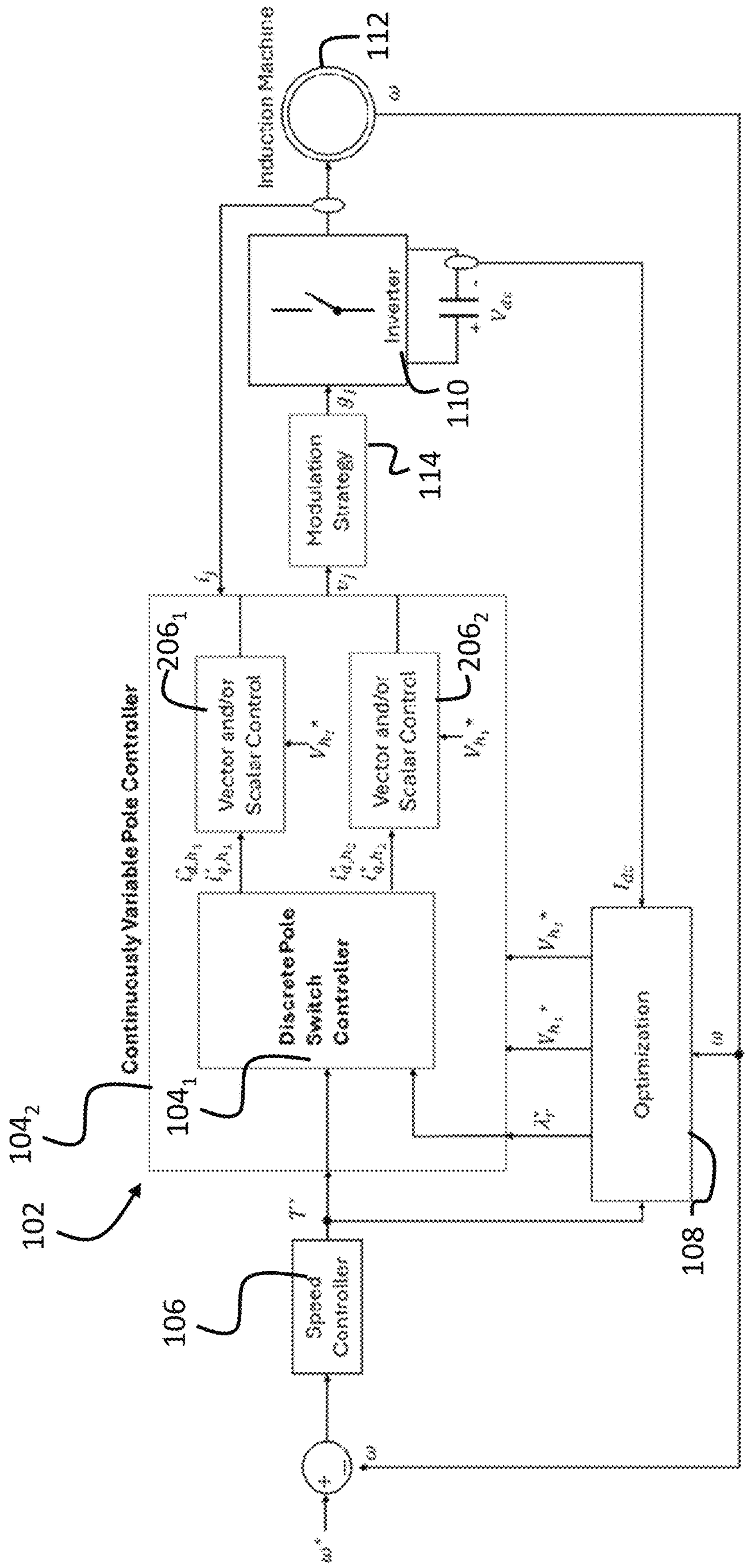
FIG. 2B is a block diagram of a preferred induction motor consistent with FIG. 1 and having a continuously variable pole controller.

FIG. 2B shows details of a continuous variable pole controller 104$_2$ that includes the discrete variable pole controller 104$_1$ in a master-slave configuration, with a vector and/or scalar control module 206$_1$ and a vector and/or scalar control module 206$_2$, one of which will be a master control module and the other a slave control module.

$$i_d^* \text{ and } i_q^*$$

are d-axis and q-axis current commands. The subscripts $h_1$ and $h_2$ correspond to the new and previous pole configuration in discrete control when switching pole configurations, respectively. In steady-state, only $h_1$ subscripts are present and $h_2$ subscript variables are zero. The continuous variable pole controller 104$_2$ operates on a master slave architecture. The vector and/or scalar control module 206$_1$ when operating as a master is controlled by vector control while the slave vector and/or scalar control module 206$_2$ applies the optimum voltage command in the same direction as the master. The discrete variable pole controller 104$_1$ switches master/slave when the dominant pole changes for better controllability. For the vector control 206, inputs are d- and q-axis current commands from the torque to current modules 202 and 204 with subscripts corresponding to pole count. $I_j$ inputs are the measured motor currents per phase. Outputs $v_j$ are the desired phase voltage commands. The vector control module 206 can be considered a form of current to voltage controller. Phase voltage commands $v_j$ are fed to modulation strategy module 114 that changes them to digital switching PWM command fed externally to the inverter switches 110.

In FIGS. 1-2J, when ramping up torque in the new configuration $h_1$ at the same rate as torque decay due to deflux $h_2$ the control by the variable pole controller 104 beings by setting the torque derivative to zero:

$$\frac{dT_e}{dt} = 0$$

where $T_e$ is the electrical torque. This leads to the following condition on q-axis current:

$$i_{qs,2} = i_{qs,1}\frac{k_1\frac{d\lambda_{r1}}{dt}}{k_2\frac{d\lambda_{r2}}{dt}}$$

Where $i_{qs,1}$ and $i_{qs,2}$ are the q-axis currents of configurations 1 and 2, $k_1$ and $k_2$ are torque constants and $\lambda_{r1}$ and $\lambda_{r2}$ are the rotor flux linkages in rotor flux reference frame. When the fluxes are transitioned linearly, this simplifies to:

$$i_{qs,h_2} = i_{qs,h_1}\frac{k_1\lambda_{r,h_1}(\infty)}{k_2\lambda_{r,h_2}(0)} = Di_{qs,h_1}$$

Where $\lambda_{r,h_1}(\infty)$ is the steady-state flux linkage of configuration 1 after the pole transition is completed while $\lambda_{r,h_2}(0)$ is the initial flux linkage in configuration 2 before turning it off, and D is defined as a droop constant.

Figure 3:
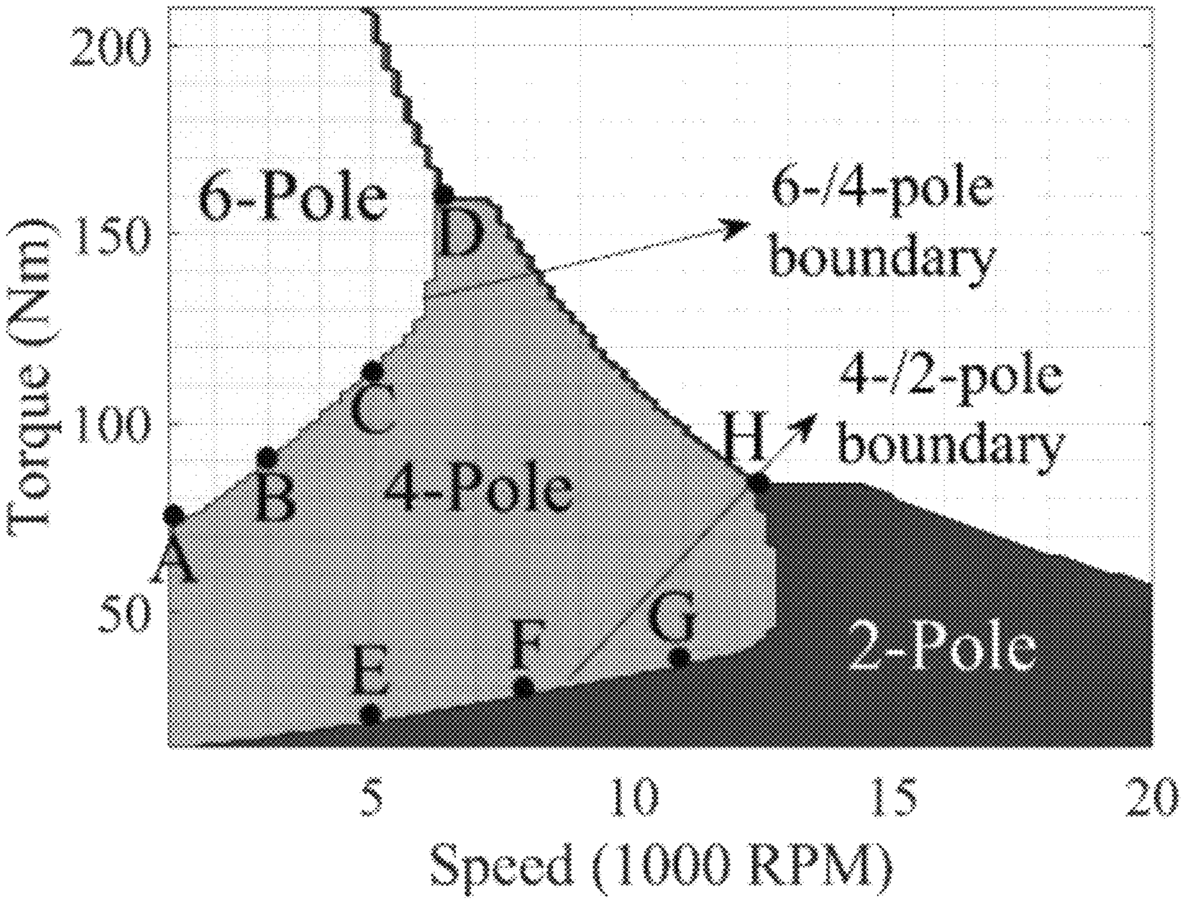
FIG. 3 graphically illustrates optimal pole selection for loss minimization by the variable pole controller of FIGS. 1-2B.

FIG. 3 shows an example optimal pole selection for loss minimization. At the boundary regions, a pole is transitioned for better efficiency by defluxing one configuration while the next configuration is turned on. Points A, B, D, and D are boundary points where a pole is transitioned from six to four pole or vice versa. Points E, F, G, and H are boundary points where pole is transitioned between two and four pole.

Figure 4A:
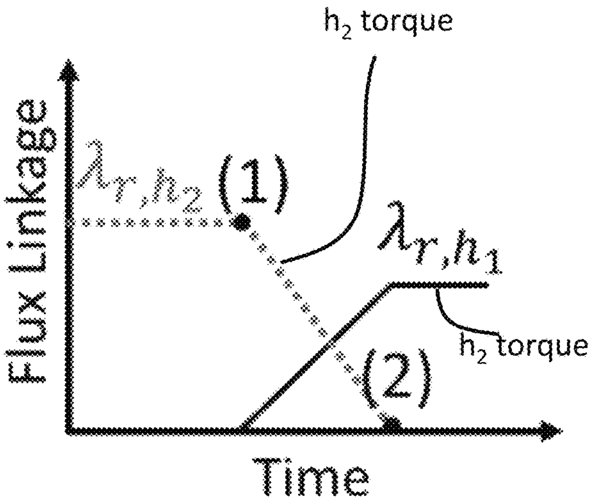
FIGS. 4A-C illustrates the variable pole control using a ramp flux transition from configuration $h_2$ to $h_1$.
Figure 4B:
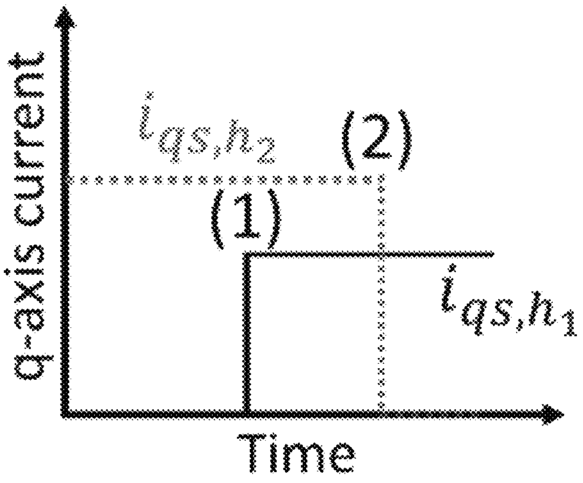
Figure 4C:
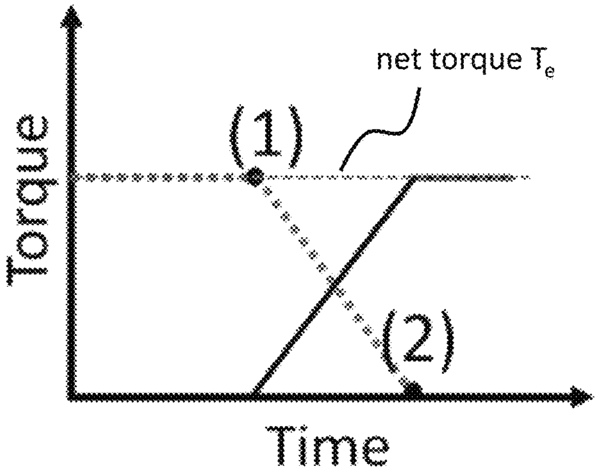
Figure 5:
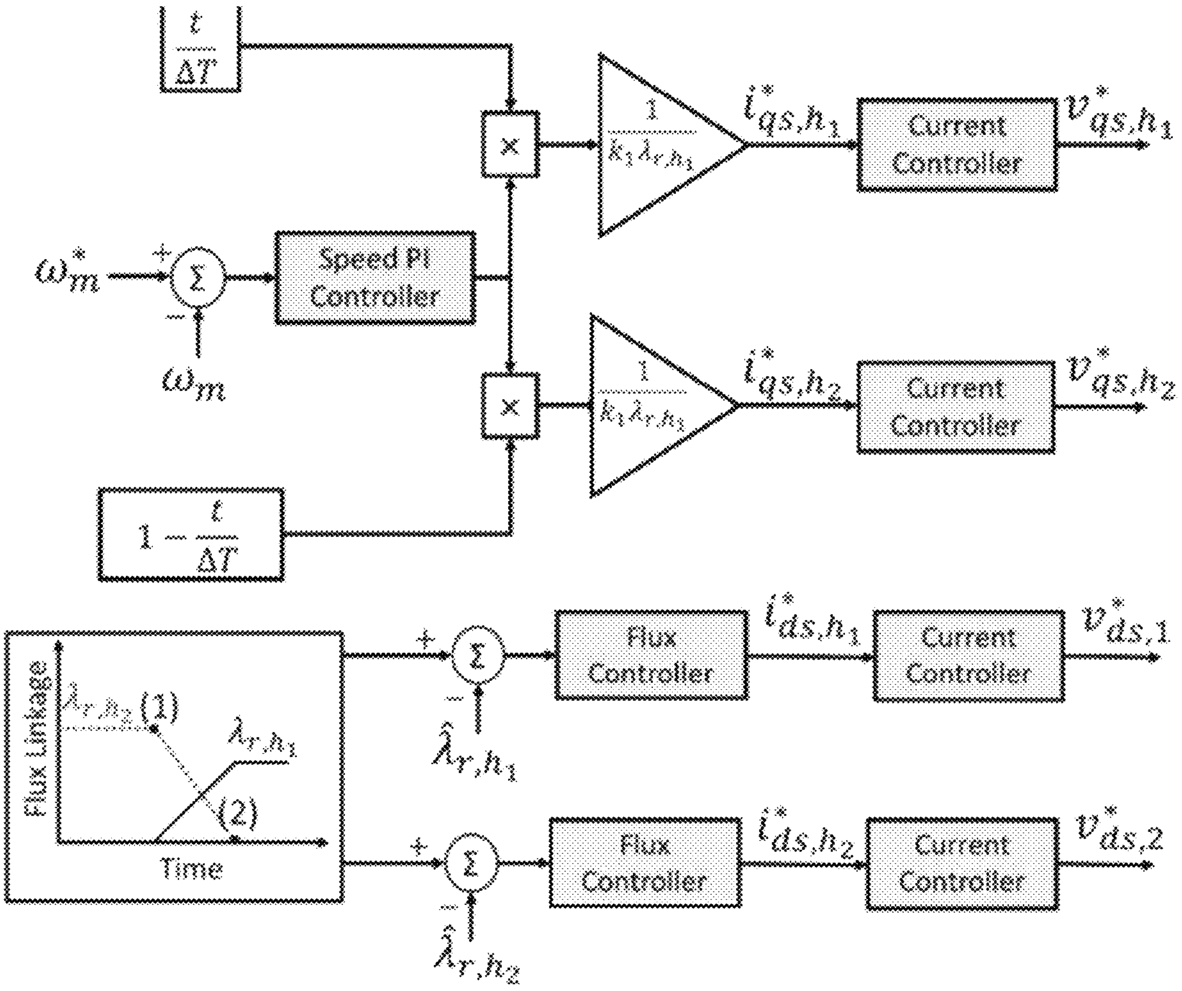
FIG. 5 and FIGS. 6A-6D show a preferred control implementation to satisfy droop control of the invention and ramp up torque in a new configuration $h_1$ at the same rate as torque decay due to deflux $h_2$.

FIGS. 4A-C illustrates the variable pole control using a ramp flux transition from configuration $h_2$ to $h_1$. At the start of the transition identified as point (1), the q-axis current controller of $h_1$ is turned on right away to produce a torque equal to the decrease in torque caused by defluxing $h_2$. Flux linkage of configuration 1 is ramped down while configuration 2 flux is being ramped up. iqs of configuration 2 is turned on at the start of the transition (or in a variation is already one while configuration 1 is selected), with a gain C in FIG. 4C, to ensure that mode 2 ramps up its torque at the same rate that mode 1 reduces its torque, which provides a smooth transition. This leads to a bumpless torque transition as shown in FIG. 4C and FIG. 3.

To achieve the fastest transition duration $\Delta t$ from $h_2$ to $h_1$ given the flux, voltage and current constraint, a preferred controller and control method use the following optimization problem based on control simulation.

Subject to min$\Delta t$

1 RMS Current Constraint Coming from Drive.

$$i_{ds,h_1}^2 + i_{ds,h_2}^2 + i_{qs,h_1}^2 + i_{qs,h_2}^2 \le I_{rated}^2$$

$$i_{ds,h_1} = \frac{\lambda_{r,h_1}(\infty)}{L_{m,h_1}}\left(\frac{t+\tau_{r,h_1}}{\Delta t}\right)$$

$$i_{ds,h_2} = \frac{\lambda_{r,h_2}(\infty)}{L_{m,h_2}}\left(1-\frac{t+\tau_{r,2}}{\Delta t}\right)$$

$$i_{qs,h_1} = \frac{T_e}{k_1\lambda_{r,h_1}(\infty)}$$

$$i_{qs,h_2} = \frac{T_e}{k_2\lambda_{r,h_2}(0)}$$

Where $I_{rated}$ is the rms rated current, $i_{ds,h_1}$ and $i_{ds,h_2}$ are the d-axis currents of configurations 1 and 2 and $\tau_{r,h_1}$ and $\tau_{r,h_2}$ are the rotor time constants of configurations $h_1$ and $h_2$.

2 Peak Voltage is Constrained Using the Following Voltage Equations:

$$v_{ds,h_1} = -\omega_{e,h_1}\sigma_1 L_{s,h_1}\frac{T_e}{k_1\lambda_{r,h_1}(\infty)} + \frac{\lambda_{r,h_1}(\infty)}{\Delta t}$$

$$v_{ds,h_2} = -\omega_{e,h_2}\sigma_2 L_{s,h_2}\frac{T_e}{k_2\lambda_{r,h_2}(0)} + \frac{\lambda_{r,h_2}(0)}{\Delta t}$$

$$v_{qs,h_1} = \omega_{e,h_1}\lambda_{r,h_1}(\infty)\frac{t}{\Delta t}$$

$$v_{qs,h_1} = \omega_{e,2}\lambda_{r,h_2}(0)\left(1-\frac{t}{\Delta t}\right)$$

Where $\nabla_{ds,h_1}$ and $v_{ds,h_2}$ are the d-axis voltages, $\nabla_{qs,h_1}$ and $\nabla_{qs,h_2}$ are the q-axis voltages, $\omega_{e,h_1}$ and $\omega_{e,h_2}$ are the electrical frequencies of $h_1$ and $h_2$, $\sigma_1$ and $\sigma_2$ are leakage dependent coefficients, and $L_{s,h_1}$ and $L_{s,h_2}$ are the self inductances of $h_1$ and $h_2$.

3 Flux Linkage Equation Constrained by Yoke Saturation.

$$\frac{t}{\Delta t}\left(\lambda_{r,h_1}(\infty) - \lambda_{r,h_2}(0)\right) + \lambda_{r,h_2}(0) \le \lambda_{rated}$$

FIG. 3 specifically shows the peak voltage and rms current as a function of speed on the six- to four-pole boundary for 100 ms transition. Points A, B, C and D, are marked on FIG. 3. A higher current is required at higher speeds because pole count is transitioned at larger torque. The fastest transition time achievable within the drive rms current limit of 36 A and peak voltage limit of 230V was determined. Transition time is faster than 200 ms and is sometimes as fast as 80 ms. Transitions faster than 100 ms are achieved below speed of point C. Beyond point C, the transition time increases because pole is transitioned at higher torque which requires higher q-axis current which leaves less headroom to inject d-axis current which is needed to transition the flux. The transition time is still fast over the entire range with less than 200 ms. Thus, the control is bumpless with less than 5% torque bump and fast.

The machines of FIGS. 1-2J can be configured as a combination several pole configurations in steady-state. Variable pole control (6-/4-/2-pole) achieves a similar torque-speed envelope in the intermediate speed range compared to conventional control.

The preferred controllers use a maximum torque-per-ampere optimization algorithm 108 to select the mix of six- and two-pole steady state d- and q-axis currents to maximize torque.

$$T_e = k_1 i_{ds,1} i_{qs,1} + k_2 i_{ds,2} i_{qs,2}$$

where $k_1$ and $k_2$ are the torque constants of pole counts $p_1$ and $p_2$, $i_{ds,1}$ and $i_{ds,2}$ are the d-axis currents of $p_1$ and $p_2$ in rotor flux reference frame, and $i_{qs,1}$ and $i_{qs,2}$ are the q-axis currents of $p_1$ and $p_2$. This is subject to current, voltage and flux linkage constraints. It is noted that the optimization algorithm can use either or both of maximum torque-per-ampere (MTPA) or maximum efficiency.

The preferred controllers in FIGS. 1-2J provide a new pole-changing framework by superimposing pole counts rather than discretely selecting them. Torque capability can be increased at certain speed ranges without needing the extra capability to reconfigure to new poles, which reduces the number of inverter legs and simplifies winding design, can eliminate radial force concerns during pole dynamics and essentially completely eliminate the concept of pole dynamics. This eliminates the risk of poor transient performance.

Variable-pole operation in FIGS. 1-2J can be thought of as harmonic injection. With multiphase drives (more than three phases), harmonics can be used to generate torque. However, the key difference is that in harmonic injection, the machine is designed at the fundamental component with ideally a square wave MMF (magneto-motive force). Harmonics are used to increasing torque capability by shaping the MMF which means that the ratio of harmonic to fundamental remains constant irrespective of operating point. In a FIGS. 2J, a machine core is designed to deliver peak torque at the highest harmonic/pole (6-pole in FIG. 3) which minimizes yoke length. A mix of the fluxes is used but their ratio is not fixed to shape the MMF, and instead the ratio of the two depends on the speed. At low speeds, the highest harmonics (six-pole) are used to deliver peak torque and is the ideal flux looks like a sinusoidal third harmonic. In the intermediate speed range, a mix of the two harmonics (six- and two-pole) is used but their ratio is not fixed to maximize torque at each operating condition and the flux looks like a superposition of six and two-pole. Upon shift to high speeds, the flux ratio transitions to favor two-pole operation until six-pole is completely deflexed at high speeds because it is limited by flux weakening. This means that the MMF shape shifts from a third harmonic at low speeds to a first harmonic at high speeds with a mix of the two used in the intermediate speed range. Thus, three major key differences: 1) the present variable pole control does not shape the MMF in a certain way but rather uses an optimal mix of two different pole counts to maximize torque which means that 2) variable pole control factors in the operating torque-speed point when determining the ratio of different pole counts and 3) variable pole control sizes the yoke at the largest pole.

Design Considerations and Analysis-Pole Transition Model

In designing variable pole control motors consistent with FIGS. 1-2J, the following analysis will provide further guidance to artisans. A generalized multiphase excitation can be decomposed into several αβ subspaces using an expanded Clarke transformation matrix K:

$$K = \begin{bmatrix} 1 & \cos\delta & \cos 2\delta & \ldots & \cos(n_{inv}-1)\delta \\ 0 & \sin\delta & \sin 2\delta & \ldots & \sin(n_{inv}-1)\delta \\ 1 & \cos 2\delta & \cos 4\delta & \ldots & \cos(n_{inv}-1)2\delta \\ 0 & \sin 2\delta & \sin 4\delta & \ldots & \sin(n_{inv}-1)2\delta \\ \ldots & \ldots & \ldots & \ldots & \ldots \\ 1 & 1 & 1 & \ldots & 1 \\ 1 & -1 & 1 & \ldots & -1 \end{bmatrix} \quad (1)$$

where $n_{inv}$ is the number of inverter terminals connected to multiphase motor windings, spatially separated by δ

$$\delta = \frac{2\pi}{n_{inv}} \quad (2)$$

The first $n_{inv}-2$ rows, if $n_{inv}$ is even, and $n_{inv}-1$ rows, if $n_{inv}$ is odd, are the αβ stationary coordinates. The last two rows are the respective zero-sequence rows $0^+$ and $0^-$. The last row is omitted when $n_{inv}$ is odd. This definition of the K matrix scales the amplitude by $$\frac{n_{inv}}{2}.$$

It can be seen that the Clarke matrix K is a discrete Fourier transform (DFT) of the spatial excitation vector x when each cosine and sine row is expressed as:

$$X_{\alpha,h} = \sum_{k=0}^{n_{inv}-1} x_k \cos\left(\frac{h2\pi k}{n_{inv}}\right) \quad (3)$$

$$X_{\beta,h} = \sum_{k=0}^{n_{inv}-1} x_k \sin\left(\frac{h2\pi k}{n_{inv}}\right) \quad (4)$$

where $x_k$ are instantaneous phase quantities in windings 1 to $n_{inv}$, $X_{\alpha,h}$ and $X_{\beta,h}$ are the $\alpha\beta_h$ coordinates of spatial harmonic h, corresponding to pole configuration h=p/2. Thus, the Clarke matrix decomposes the excitation vector into its spatial harmonic spectra. Once in the $\alpha\beta_h$ subspace, each configuration h can be rotated into an arbitrary reference frame to get $d_{qh}$ coordinates. This analysis uses a rotor flux reference frame.

Dynamic Full-Order Model

Because of orthogonality, each pole count p=2 h is associated with its own rotating $dq_h$ model aligned with a rotor flux associated with harmonic h:

$$v_{ds,h} = R_s i_{ds,h} - \omega_{e,h}\lambda_{qs,h} + \frac{d\lambda_{ds,h}}{dt} \quad (5)$$

$$v_{qs,h} = R_s i_{qs,h} + \omega_{e,h}\lambda_{ds,h} + \frac{d\lambda_{qs,h}}{dt} \quad (6)$$

$$0 = R_r i_{dr,h} + \frac{d\lambda_{r,h}}{dt} \quad (7)$$

$$0 = R_r i_{qr,h} + \omega_{s,h}\lambda_{r,h} \quad (8)$$

$$\lambda_{ds,h} = L_{s,h} i_{ds,h} + L_{m,h} i_{dr,h} \quad (9)$$

$$\lambda_{qs,h} = L_{s,h} i_{qs,h} + L_{m,h} i_{qr,h} \quad (10)$$

$$\lambda_{r,h} = L_{m,h} i_{ds,h} + L_{r,h} i_{dr,h} \quad (11)$$

$$0 = L_{m,h} i_{qs,h} + L_{r,h} i_{qr,h} \quad (12)$$

where $\nabla_{as,h}$, $\nabla_{qs,h}$, $i_{ds,h}$ and $i_{qs,h}$ are stator voltages and currents in a rotating reference frame dq aligned with the rotor flux of harmonic h, $i_{dr,h}$ and $i_{qr,h}$ are rotor $dq_h$ currents referred to the stator, $\lambda_{ds,h}$ and $\lambda_{qs,h}$ are stator flux linkages, $\lambda_{r,h}$ is the rotor flux linkage of harmonic h to which the frame is aligned to, and $\omega_{e,h}$ and $\omega_{s,h}$ are the electrical and slip frequencies of harmonic h. Parameters $R_s$ and Ry are the stator and rotor resistances of a winding connected to an inverter terminal with $n_{inv}$ total legs, and $L_{m,h}$, $L_{s,h}$ and $L_{r,h}$ are the magnetizing, stator, and rotor self-inductances. Parameter estimation methods for pole-changing machines have been published and can be used to extract these parameters. See, M. P. Magill, P. T. Krein, and K. S. Haran, "Equivalent circuit model for pole-phase modulation induction machines," in Proc. IEEE International Electric Machines Drives Conf. (IEMDC), 2015, pp. 293-299; G. F. Olson, Y. Wu, and L. Peretti, "Parameter estimation of multiphase machines applicable to variable phase-pole machines," IEEE Trans. Energy Conversion, pp. 1-10, 2023.

The net electrical torque $T_e$ is given by:

$$T_e = \frac{1}{n_{inv}} \sum_h 2h \frac{L_{m,h}}{L_{r,h}} \lambda_{r,h} i_{qs,h} = \sum_h k_h \lambda_{r,h} i_{qs,h} \quad (13)$$

where $k_n$ is a pole-count-dependent torque variable that depends on machine parameters. $k_n$ varies with time due to parameter variation resulting from the nonlinearity of the B-H curve at different operating conditions. In this discussion, $k_n$ is assumed to be constant without adapting for various operating conditions and harmonic injection.

Dynamic Reduced-Order Model

Because $i_{ds,h}$ and $i_{q,sh}$ have much faster time constants than flux, time-scale separation can be applied. The currents can be treated as algebraic variables in the flux dynamics. The model is simplified into two equations corresponding to the flux linkages in each pole configuration, $\lambda_{r,h_1}$ and $\lambda_{r,h_2}$, given by:

$$L_{m,h_1} i_{ds,h_1} = \lambda_{r,h_1} + \tau_{r,h_1} \frac{d\lambda_{r,h_1}}{dt} \quad (14)$$

$$L_{m,h_2} i_{ds,h_2} = \lambda_{r,h_2} + \tau_{r,h_2} \frac{d\lambda_{r,h_2}}{dt} \quad (15)$$

$$\text{where } \tau_{r,h_1} = \frac{L_{r,h_1}}{R_{r,h_1}} \text{ and } \tau_{r,h_2} = \frac{L_{r,h_2}}{R_{r,h_2}}$$

are the rotor time constants. The flux transition from one configuration to another depends on the injected d-axis current. The q-axis current determines the torque, $$i_{qs,h_1} = \frac{T_{e,h_1}}{k_{h_1} \lambda_{r,h_1}} \quad (16)$$

$$i_{qs,h_2} = \frac{T_{e,h_2}}{k_{h_2} \lambda_{r,h_2}} \quad (17)$$

Radial Forces

Variable Pole Control Module 104 in FIGS. 1A-2

Bumpless Torque Condition

The following condition must hold to keep the torque constant throughout a pole transition:

$$\frac{dT_e}{dt} = 0 \quad (20)$$

By applying the derivative to (13):

$$\frac{\partial T_e}{\partial \lambda_{r,h_1}} \frac{\partial \lambda_{r,h_1}}{dt} + \frac{\partial T_e}{\partial i_{qs,h_1}} \frac{di_{qs,h_1}}{dt} + \frac{\partial T_e}{\partial \lambda_{r,h_2}} \frac{\partial \lambda_{r,h_2}}{dt} + \frac{\partial T_e}{\partial i_{qs,h_2}} \frac{di_{qs,h_2}}{dt} = 0 \quad (21)$$

This condition is decoupled into two components. $g_1$ captures the impact of flux change and $g_2$ captures the impact of current change on torque.

$$g_1 = \frac{\partial T_e}{\partial \lambda_{r,h_1}} \frac{d\lambda_{r,h_1}}{dt} + \frac{\partial T_e}{\partial \lambda_{r,h_2}} \frac{d\lambda_{r,h_2}}{dt} \quad (22)$$

$$g_2 = \frac{\partial T_e}{\partial i_{qs,h_1}} \frac{di_{qs,h_1}}{dt} + \frac{\partial T_e}{\partial i_{qs,h_2}} \frac{di_{qs,h_2}}{dt} \quad (23)$$

These equations have physical interpretations. Electrical torque will vary for a constant $i_{qs}$ during a flux transition unless condition (22) is met. The second condition (23) means that a variation in $i_{qs}$ leads to a change in torque. The goal is to ensure that the torque change due to flux is zero by meeting condition (22), so $$i_{qs,h_2} = i_{qs,h_1} \frac{-k_{h_1} \frac{d\lambda_{r,h_1}}{dt}}{k_{h_2} \frac{d\lambda_{r,h_2}}{dt}} \quad (24)$$

Here (24) represents a "bumpless torque condition," which enforces zero torque variation with respect to flux transient during pole-changing. The q-axis current can still be used to alter torque because (23) is not set to zero, which enables tracking of a varying reference torque, even through a transition. This droop approach is shown in FIGS. 4A-4C.

Flux is controlled to transition linearly from $h_2$ to $h_1$ with equal absolute value of the rate of transition, $$\lambda_{r,h_1} = \begin{cases} \Lambda_1 \frac{t}{\Delta t} & t < \Delta t \\ \Lambda_1 & t \geq \Delta t \end{cases} \quad (25)$$

$$\lambda_{r,h_2} = \begin{cases} \Lambda_2 \left(1 - \frac{t}{\Delta t}\right) & t < \Delta t \\ 0 & t \geq \Delta t \end{cases} \quad (26)$$

where Δt is the pole transition duration over which both configurations $h_1$ and $h_2$ co-exist, and $\Lambda_1$ and $\Lambda_2$ are the peak rotor flux linkage values when each configuration is operating on its own, i.e., after and before transitioning. For example, at t=0, only configuration $h_2$ has a flux linkage value equal to $\Lambda_2$ and at t=Δt, the flux of $h_2$ is zero and the flux of $h_1$ reached its steady-state value of $\Lambda_1$. For this particular transition strategy and using the reduced order model from above, (24) can be rewritten as:

$$i_{qs,h_2} = i_{qs,h_1} \frac{k_{h_1} \Lambda_1}{k_{h_2} \Lambda_2} = D i_{qs,h_1} \quad (27)$$

where D is a droop constant which depends on parameters $k_{h_1}$ and $k_{h_2}$ and the flux transition approach. D can be interpreted as the relation between the q-axis currents of the two modes that leads to zero torque variation with respect to flux transition when changing poles.

Figure 6A:
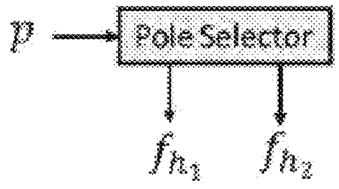
Figure 6B:
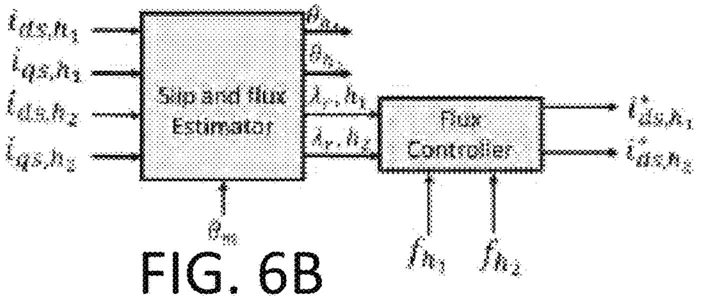
Figure 6C:
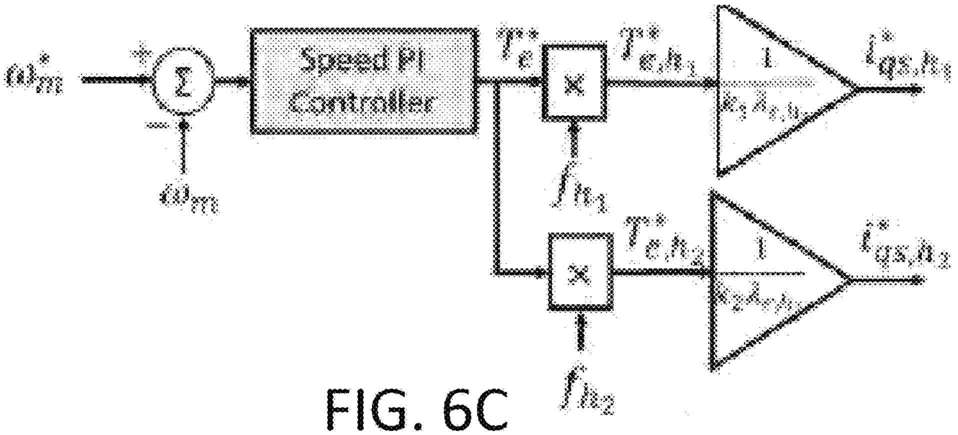
Figure 6D:
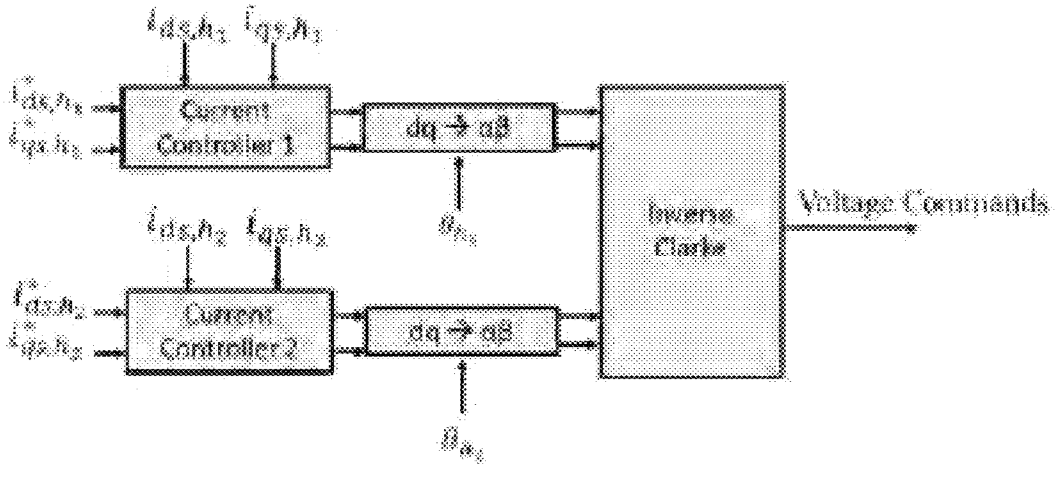

FIG. 5 and FIGS. 6A-6D show a preferred control implementation to satisfy droop control of the invention and ramp up torque in a new configuration $h_1$ at the same rate as torque decay due to deflux $h_2$. The torque command is divided amount the two configurations in a proportional manner. The control implementation of FIG. 5 and FIGS. 6A-6D satisfies (27). FIG. 6A shows a pole selector module, FIG. 6B a slip and flux estimator, FIG. 6C the speed controller (module 106 in above FIGS.), and FIG. 6D the current controllers. The variable pole controller 104 divides the torque command. The slip and flux estimator is part of the variable pole controller 104. The pole selector is part of the optimization algorithm 108.

During transients, the pole selector module (FIG. 6A) generates two functions $$f_1 = \frac{t}{\Delta t}$$

and $$f_2 = 1 - f_1.$$

In steadystate $f_1$ is either 0 or 1 and $f_2$ is its complement. These functions are multiplied by the flux and torque commands of each configuration, which results in linear flux and torque transitions. Since the torque command is divided by flux and both use the same linear transition function, constant $i_{qs}$ commands are obtained as in (16)-(17) and are related by the droop constant D. The rest of the architecture is a standard speed control architecture. Flux and slip (FIG. 6B) are estimated using the measured currents, (14)-(15), and (8). Speed encoder data and estimated slip angle are used to calculate rotor flux position and align with it. When a configuration is not being used, its angle is still updated using speed encoder data, but its slip is set to zero.

Impact of Inverter Limits on Transition Time.

The inverter 114 has practical limits in terms of voltage, current limits, and operating conditions on transition time Δt. Using the reduced-order model from above, $i_{ds}$ is given by $$i_{ds,h_1}\frac{\Lambda_1}{L_{m,h_1}}\left(\frac{t+\tau_{r,h_1}}{\Delta t}\right) \quad (28)$$

$$i_{ds,h_2}\frac{\Lambda_2}{L_{m,h_2}}\left(1-\frac{t+\tau_{r,h_2}}{\Delta t}\right) \quad (29)$$

$i_{qs}$ is given by $$i_{qs,h_1}=\frac{T_e}{k_1\Lambda_1} \quad (30)$$

$$i_{qs,h_2}=\frac{T_e}{k_2\Lambda_2} \quad (31)$$

To protect the inverter, RMS current is limited to $$i^2_{ds,h_1}+i^2_{ds,h_2}+i^2_{qs,h_1}+i^2_{qs,h_2}\leq I^2_{limit} \quad (32)$$

where $I_{limit}$ is the inverter current limit. Approximate analytical expression of voltages $v_{ds}$ and $v_{qs}$ are obtained using the reduced-order model and are given by $$v_{ds,h_1}=-\omega_{e,h_1}\sigma_1 L_{s,h_1}\frac{T_e}{k_1\Lambda_1}+\frac{\Lambda_1}{\Delta t} \quad (33)$$

$$v_{ds,h_2}=-\omega_{e,h_2}\sigma_2 L_{s,h_2}\frac{T_e}{k_2\Lambda_2}-\frac{\Lambda_2}{\Delta t} \quad (34)$$

$$v_{qs,h_1}=\omega_{e,h_1}\Lambda_1\frac{t}{\Delta t} \quad (35)$$

$$v_{qs,h_2}=\omega_{e,h_2}\Lambda_2\left(1-\frac{t}{\Delta t}\right) \quad (36)$$

The voltage due to transitioning flux is much smaller than the back EMF and can reduce the voltage peak. However, the voltage affects the current constraint in flux-weakening operation, where a larger q-axis current is required to produce a given torque with lower flux. Flux does not limit dynamic pole changing with the strategy given here because, at the pole transition boundaries, the higher pole count operates in a flux-weakened steady-state condition, Thus, the linear torque transition strategy given in (25), (26) ensures no need for an additional flux limit constraint since the higher pole count operates at partial flux during a transition.

A conventional polar voltage limiter can be used to ensure that the operation is within the linear range at every instant, to avoid the case where the voltages between transitioning phases doesn't add up because of the vector nature of the sums. During the transition process, the polar voltage limited enforces a limit at certain instants without significantly impacting the normal operation, since these peak voltage moments are brief relative to the pole-changing process. In testing, a speed disturbance remained less than 0.5%. Higher torque ripple is observed at this testing condition compared to lower speeds, but these are also present when operating in single pole-configuration mode and can be attributed to the inherent torque ripple in the experimental system.

Experimental Motor Data

The experimental motor was toroidally-wound VPIM that can be reconfigured for two-, four- and six-pole operations. Flux transitions as fast as 200 ms were tested. Small experimental torque variations exist because the model-based bumpless torque trajectory does not exactly match shaft torque due to parameter uncertainty and nonlinearities. Nonetheless, torque variations are maintained below 3.9% at worst and 0.75% at best, within the machine's inherent torque ripple of 5% and nearly imperceptible in some cases. Under speed control, these shaft torque errors lead to speed deviations less than 2% at worst and 0.5% at best, even though the experimental setup is a low inertia system. The speed controller reduces this mismatch by slightly altering the ideal q-axis current trajectory.

The table below summarizes an experimental motor consistent with FIG. 1, FIG. 2B and FIGS. 5-6D.

| Quantity | Value |
|---|---|
| Peak torque (N · m) | 3.2 |
| Base speed (RPM) | 900 |
| Max speed (RPM) | 1800 |
| Maximum transition speed (RPM) | 1800 |
| Maximum transition torque (N · m) | 2.1 |
| dc link voltage (V) | 70 |
| Motor inertia J (kg · $m^2$) | 0.00584 |
| Two-pole torque constant $k_1$ | 0.05 |
| Four-pole torque constant $k_2$ | 0.12 |
| Six-pole torque constant $k_3$ | 0.15 |
| Stator resistance $R_s$(Ω) | 0.6 |
| Rotor resistance $R'_{r,1}$(Ω) | 0.66 |
| Rotor resistance $R'_{r,2}$(Ω) | 0.4 |
| Rotor resistance $R'_{r,3}$(Ω) | 0.36 |
| Magnetizing inductance $L_{m,1}$ (mH) | 80.6 |
| Magnetizing inductance $L_{m,2}$ (mH) | 25.7 |
| Magnetizing inductance $L_{m,3}$ (mH) | 9.4 |

Maximum rms current and peak voltage during a transition from six to four poles over the boundary torque speed points marked in FIG. 3 showed a fixed transition time of 100 ms. The maximum rms current during a transition increases with torque because a higher $i_{qs}$ is required. Thus, current requirement is highest at point D, representing a torque-speed envelope point. To achieve a 100 ms transition at point D, the rms current would have to exceed the inverter limit. The current can be decreased by reducing the d-axis injection current, leading to a slower transition. A slowest transition occurs at point D. Although the transition duration is longer and lasts around 250 ms at D, it is still faster and smoother than an automatic transmission and has minimal impact in a large inertia system such as EV. The 250 ms limit is a worst-case approximation since the inverter thermal mass may support the current beyond the rating for this brief duration. Flux transitions were within 60-250 ms.

Robustness was tested at the highest torque and highest speed transitions. Even when pole count was reconfigured every second in a low-inertia test system, the speed remained within 2% and 0.5% at 900 and 1800 RPM, respectively. A large inertia system such as an EV can tolerate a relatively larger torque ripple without significantly impacting wheel speed. The percentage of torque ripple observed using both the high-power simulation and low-power experimental machines is considerably lower and briefer than with an automatic transmission and will likely not impact the speed in a traction system. These results validate that the invention can achieve a fast and practically bumpless pole transition that only relies on the control platform to correct estimation errors. This allows for electronic pole changing to be achieved much faster and smoother than a typical automatic transmission provides the ability for further optimizing the transition to optimize the dynamic loss of VPIM drives over actual drive cycles for a particular application of the invention.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An induction motor, comprising:

a plurality of flux linkage configurations that control current to drive relative movement between a rotor and a stator, wherein each flux configuration powers a different number of poles; and a controller that is configured to droop switch flux linkage configurations by ramping up torque in a new configuration $h_1$ at the same rate as torque decay by decaying flux from a previous configuration $h_2$.

2. The induction motor of claim 1, wherein the controller commands a continuous reconfiguration of superimposed flux states.

3. The induction motor of claim 2, wherein the controller maintains linkage to two of the plurality of flux linkage configurations during steady state motor operation.

4. The induction motor of claim 1, wherein the controller sets a transition between flux configurations by ramping up torque in the new configuration $h_1$ at the same rate as torque decay due to deflux $h_2$ the control beings by setting the torque derivative to zero $$\frac{dT_e}{dt} = 0$$

where $T_e$ is the electrical torque, which leads to the following condition on q-axis current $$i_{qs,2} = i_{qs,1}\frac{k_1\frac{d\lambda_{r1}}{dt}}{k_2\frac{d\lambda_{r2}}{dt}},$$

where where $i_{qs,1}$ and $i_{qs,2}$ are the q-axis currents of configurations 1 and 2, $k_1$ and $k_2$ are torque constants and $\lambda_{r1}$ and $\lambda_{r2}$ are the rotor flux linkages in rotor flux reference frame.

5. The multiple pole induction motor of claim 1, comprising windings driving relative movement between the stator and the rotor;

modular inverters driving the windings;

a multiple leg converter;

speed feedback, wherein the controller receives current and speed feedback and sets active poles in view of a commanded speed or speed change.

6. The multiple pole induction motor of claim 1, comprising a modulation module between the variable pole controller and an inverter that drives the plurality of flux linkage configurations.

7. The multiple pole induction motor of claim 6, wherein the modulation module conducts one of a sine triangle and space vector modulation.

8. The multiple pole induction motor of claim 6, wherein the modulation module conducts an operation to ensure a non-zero common mode.

9. The multiple pole induction motor of claim 1, comprising an inverter that electronically defines the plurality of flux linkage configurations.

10. The multiple pole induction motor of claim 1, wherein the controller comprises discrete control comprising a torque to current module that receives a torque command and outputs q-axis current for all pole configurations, a flux to current module that receives a rotor flux linkage command and outputs d-axis current command for all pole configurations, and a vector control module that switches pole configurations.

11. The multiple pole induction motor of claim 10, comprising a wherein the controller comprises continuous control, the continuous control comprising the discrete control arranged a master-salve arrangement.

12. The multiple pole induction motor of claim 1, wherein the controller conducts an optimal pole selection by conducting the droop switch at boundary points between flux configurations having a different number of poles.

13. The multiple pole induction motor of claim 12, wherein the optimal pole selection comprises the following optimization:

Subject to min$\Delta$t,

RMS current constraint coming from drive $$i_{ds,h_1}^2 + i_{ds,h_2}^2 + i_{qs,h_1}^2 + i_{qs,h_2}^2 \leq I_{rated}^2$$

$$i_{ds,h_1} = \frac{\lambda_{r,h_1}(\infty)}{L_{m,h_1}}\left(\frac{t+\tau_{r,h_1}}{\Delta t}\right)$$

$$i_{ds,h_2} = \frac{\lambda_{r,h_2}(0)}{L_{m,h_2}}\left(1 - \frac{t+\tau_{r,2}}{\Delta t}\right)$$

$$i_{qs,h_1} = \frac{T_e}{k_1\lambda_{r,h_1}(\infty)}$$

$$i_{qs,h_2} = \frac{T_e}{k_2\lambda_{r,h_2}(0)}$$

Where $I_{rated}$ is the rms rated current, $i_{ds,h_1}$ and $i_{ds,h_2}$ are the d-axis currents of configurations 1 and 2 and $\tau_{r,h_1}$ and $\tau_{r,h_2}$ are the rotor time constants of configurations $h_1$ and $h_2$.

14. The multiple pole induction motor of claim 13, wherein the optimization constrains peak voltage using the following voltage equations:

$$v_{ds,h_1} = -\omega_{e,h_1}\sigma_1 L_{s,h_1}\frac{T_e}{k_1\lambda_{r,h_1}(\infty)} + \frac{\lambda_{r,h_1}(\infty)}{\Delta t}$$

-continued $$v_{ds,h_2} = -\omega_{e,h_2}\sigma_2 L_{s,h_2}\frac{T_e}{k_2\lambda_{r,h_2}(0)} - \frac{\lambda_{r,h_1}(0)}{\Delta t}$$

$$v_{qs,h_1} = \omega_{e,h_1}\lambda_{r,h_1}(\infty)\frac{t}{\Delta t}$$

$$v_{qs,h_1} = \omega_{e,2}\lambda_{r,h_2}(0)\left(1 - \frac{t}{\Delta t}\right)$$

where $v_{ds,h_1}$ and $v_{ds,h_2}$ are the d-axis voltages, $V_{qs,h_1}$ and $V_{qs,h_2}$ are the q-axis voltages, $\omega_{e,h_1}$ and $\omega_{e,h_2}$ are the electrical frequencies of $h_1$ and $h_2$, $\sigma_1$ and $\sigma_2$ are leakage dependent coefficients, and $L_{s,h_1}$ and $L_{s,h_2}$ are the self inductances of $h_1$ and $h_2$.

15. The multiple pole induction motor of claim 14, wherein the optimization constrains flux linkage by yoke saturation such that $$\frac{t}{\Delta t}\left(\lambda_{r,h_1}(\infty) - \lambda_{r,h_2}(0)\right) + \lambda_{r,h_2}(0) \le \lambda_{rated}.$$

16. The multiple pole induction motor of claim 1, wherein the controller conducts an optimal pole selection using a maximum torque-per-ampere optimization algorithm to select the mix of six- and two-pole steady state d- and q-axis currents to maximize torque according to $T_e = k_1 i_{ds,1} i_{qs,1} + k_2 i_{ds,2} i_{qs,2}$, here $k_1$ and $k_2$ are the torque constants of pole counts $p_1$ and $p_2$, $i_{ds,1}$ and $i_{ds,2}$ are the d-axis currents of $p_1$ and $p_2$ in rotor flux reference frame, and $i_{qs,1}$ and $i_{qs,2}$ are the q-axis currents of $p_1$ and $p_2$.

17. A method for smoothing torque transitions of an induction motor that has a plurality of flux linkage configurations, comprising:

receiving a command to change from one of the plurality of flux configurations to another of the plurality of the flux configurations; and ramping up torque in the another flux configuration at the same rate as decaying torque in the one of the plurality of flux configurations.

* * * * *